Figure 1:
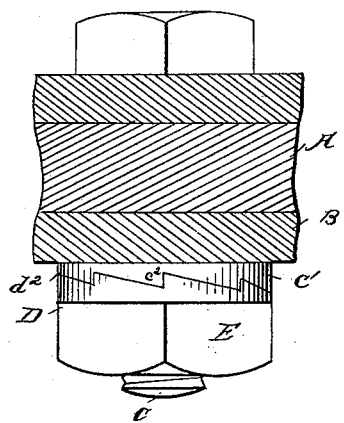

(No Model.)

J. DICKSON.
NUT LOCK.

No. 403,334. Patented May 14, 1889.

WITNESSES.
E. C. Duffy
H. E. Peck

INVENTOR.
Jonathan Dickson
por C. E. Duffy
Attorney

UNITED STATES PATENT OFFICE.

JONATHAN DICKSON, OF AGOSTA, OHIO.

NUT-LOCK.

SPECIFICATION forming part of Letters Patent No. 403,334, dated May 14, 1889.

Application filed December 28, 1887. Serial No. 259,210. (No model.)

*To all whom it may concern:*

Be it known that I, JONATHAN DICKSON, of Agosta, in the county of Marion and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in nut-locks, and more particularly to that peculiar sub-class known as "base-washer."

Heretofore in some instances nut-locks of this class consisted of a bolt having right and left screw-threads, right and left nuts upon the threaded portion of the bolt having adjacent ratchet-faces, and a soft or elastic ring compressed between the ratchet-faces. They also consisted of ratchet-notches made on a fish-plate or on a square washer rigidly secured to the fish-plate, a nut on the bolt having ratchet-notches on its inner adjacent face, and a soft or elastic ring clamped between the ratchet-notches of nut and fish-plate or washer, and, further, in some instances they also consisted of a base-washer having a pair of projections upon its inner side at the edge of its central aperture, bearing against the bolt and extending into the opening in the fish-plate. The outer side of the washer is plane-faced, except around the extreme outer edge of the same, which is provided with a circular series of upright ratchet-teeth. This washer is of greater diameter than the nut, which is screwed tightly down upon the plane portion of the washer within the circular series of teeth, and the nut is held in this position by a ring loosely slipped upon the same and provided upon its outer edge with a downwardly-extending annular flange having ratchet-notches in its lower edge fitting in the teeth of the washer; but these old constructions possess many disadvantages and are different from my invention; nor are they so cheap, simple, effective, and durable as my construction.

The object of my invention is to provide an improved nut-lock of the sub-class mentioned, which will overcome the objections to and disadvantages of the before-mentioned old constructions, and can be readily manipulated by any person and will securely lock the nut against loosening after having been tightly screwed up, and which is simple and cheap in construction and easily and readily manufactured.

With these ends in view my invention consists, essentially, in the combination of a bolt, a nut provided with one or more recesses in its inner face, and a pair of separate independent similar flat circular washers provided with central apertures to receive the bolt, one of the washers forming the inner locking-washer and having one or more lugs on its inner side fitting in recesses in the angle-bar, and radial ratchet-notches on its outer side extending from the aperture to the periphery, and the similar outer locking washer, having similar corresponding oppositely-inclined notches on its inner side tightly fitting in the notches of the inner washer, the nut being screwed tightly down upon the outer plane face of the outer washer, and one or more lugs on its outer side fitting in the recesses of the nut.

Figure 2:
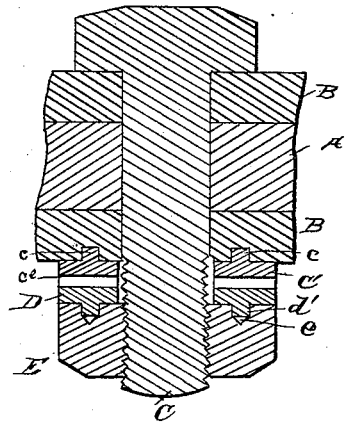
Figure 3:
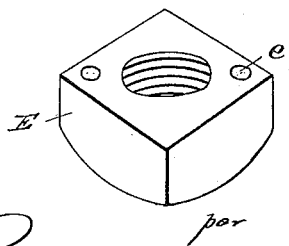

Referring to the accompanying drawings, Figure 1 is a horizontal section of a rail and angle-bars, showing the lock in position. Fig. 2 is a similar section through the rail and angle-bars and longitudinally through the nut-lock. Fig. 3 is a detail perspective view of the nut, showing the apertures in the inner face of the same.

In the drawings, the reference-letter A indicates a rail, and B B the angle-bars or fish-plates upon each side of the same.

C indicates a bolt passing through the rail and angle-bars, and E indicates the nut upon the bolt which it is desired to lock against loosening, and this object is accomplished by a pair of similar flat circular washers, C' and D, (*i. e.*, of the same proportions and size,) provided with central apertures to receive the bolt. The washer C' upon its inner side is provided with one or more longitudinally-extending lugs or projections, $c$, and upon its outer side with radial ratchet notches or serrations $c^2$, and the similar washer, D, upon its outer side is provided with one or more longitudinally-extending lugs, $d'$, and upon its inner side with corresponding oppositely-inclined radial ratchet notches or serrations $d^2$.

In assembling the parts, the bolt being in position, the inner locking-washer, $C'$, is slipped upon the bolt with its ratchet-notches upon the outer side, and its lugs $c$ fitted snugly into apertures $c'$ in the angle-bar to prevent the washer from turning. The outer locking-washer, D, is then slipped upon the bolt with its notches upon the inner side and registering with and engaging the corresponding notches of the inner similar washer, and the nut E is then screwed upon the bolt, and the lugs $d'$ upon the outer side of the outer washer are placed in apertures $e$ in the inner face of the nut to hold the same together, and the nut is then tightened until the ratchet-notches of the two washers tightly engage and fit into each other, when it will be impossible for the nut to become loosened.

What I claim is—

A nut-lock consisting, essentially, of a bolt, a nut provided with one or more recesses in its inner face, and a pair of separate independent similar flat circular washers provided with central apertures to receive the bolt, one of the washers forming the inner locking-washer and having one or more lugs on its inner side fitting in recesses in the angle-bar, and radial ratchet-notches on its outer side extending from the aperture to the periphery, and the other similar outer locking-washer having similar corresponding oppositely-inclined notches on its inner side tightly fitting in the notches of the inner washer, the nut being screwed tightly down upon the outer plane face of the outer washer, and one or more lugs on its outer side fitting in the recesses of the nut, as set forth and shown.

In testimony that I claim the foregoing as my own I affix my signature in presence of two witnesses.

JONATHAN DICKSON.

Witnesses:
C. H. IREY,
JAMES BROWN.